(12) United States Patent
Sato

(10) Patent No.: US 6,717,748 B2
(45) Date of Patent: Apr. 6, 2004

(54) LOW-COST, SINGLE FOCUS LENS

(75) Inventor: Kenichi Sato, Ageo (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/364,386

(22) Filed: Feb. 12, 2003

(65) Prior Publication Data

US 2003/0161054 A1 Aug. 28, 2003

(30) Foreign Application Priority Data

Feb. 20, 2002 (JP) ........................................ 2002-043139

(51) Int. Cl.⁷ ................................................ G02B 9/10
(52) U.S. Cl. ........................................ 359/793; 359/740
(58) Field of Search ................................ 359/708, 715, 359/718, 738, 740, 773, 774, 793

(56) References Cited

U.S. PATENT DOCUMENTS

| 5,731,912 A | 3/1998 | Abe |
| 5,973,850 A | * 10/1999 | Nagaoka ..................... 359/654 |
| 5,999,337 A | 12/1999 | Ozaki |
| 6,239,921 B1 | * 5/2001 | Isono ........................ 359/717 |

FOREIGN PATENT DOCUMENTS

| JP | 5-157962 | 6/1993 |
| JP | 11-125767 | 5/1999 |

* cited by examiner

*Primary Examiner*—Georgia Epps
*Assistant Examiner*—Darryl J. Collins
(74) *Attorney, Agent, or Firm*—Arnold International; Bruce Y. Arnold

(57) ABSTRACT

A low-cost, single focus lens that is formed of only four lens elements in two lens groups, one on each side of a diaphragm, is disclosed. A front negative lens group is formed of a first, positive meniscus lens element and a second, negative meniscus lens element, each with its convex surface on the object side. A rear positive lens group is formed of a third lens element that is biconvex and a fourth element that is made of plastic. The fourth optical element has relatively weak refractive power that is less than 10% that of the low-cost, single focus lens, and at least one surface of the fourth optical element is aspheric. Various conditions are satisfied so as to ensure that aberrations are favorably corrected while keeping manufacturing costs low and so as to ensure that the low-cost, single focus lens is compact.

4 Claims, 2 Drawing Sheets

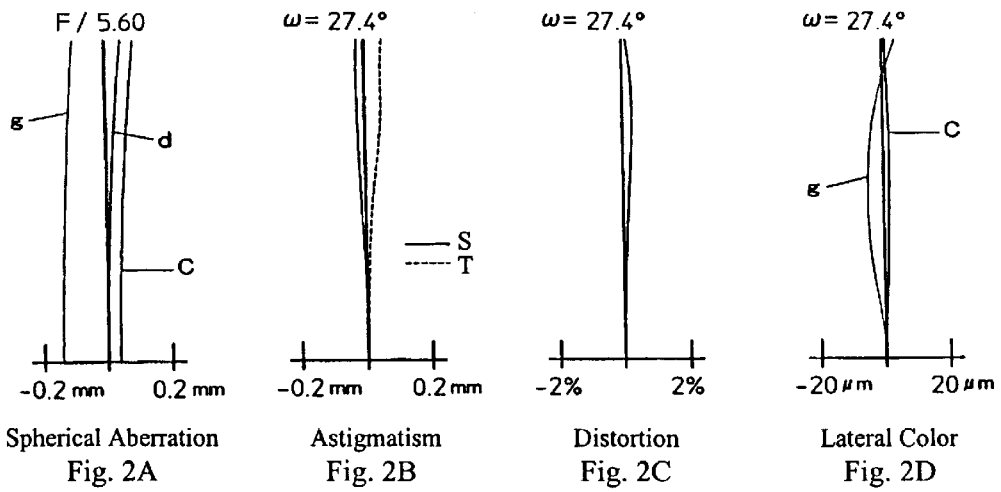
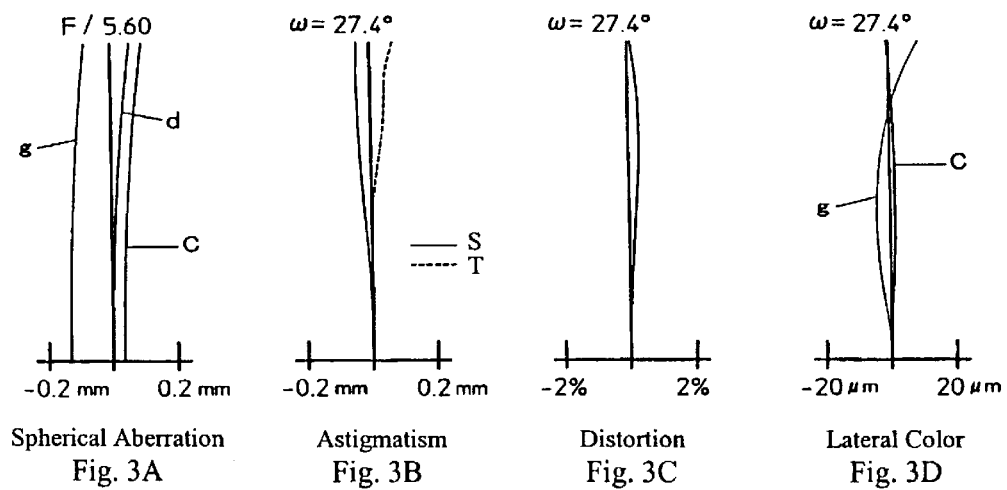

LOW-COST, SINGLE FOCUS LENS

BACKGROUND OF THE INVENTION

In recent years the use of digital cameras, which offer easy processing of digital information that has been photographed, has spread rapidly accompanying the spread of personal computers. More compact, low-cost digital cameras are being sought and, to this end, achieving a more compact, low-cost photographic lens for such a camera is an urgent task.

The photographic lenses disclosed in Japanese Laid-Open Patent Applications H5-157962 and H11-125767 are commonly known lenses that respond to these needs. However, the photographic lenses disclosed in these publications use at least five or six lens components, so further compactness and cost reduction are desired.

Digital cameras use a small electrical image sensor, in contrast to conventional compact cameras that use silver chloride film, and it is necessary in such an image sensor for the primary light rays to be incident substantially orthogonal to the entire image sensor surface. In addition, a high aperture efficiency and a long back focus are also required, and hence the design criteria for photographic lenses of digital cameras are fundamentally quite different from that of compact cameras that use silver chloride film.

BRIEF SUMMARY OF THE INVENTION

The present invention is a single focus lens that is formed of only four lens elements while favorable correcting aberrations, so as to provide a more compact and lower cost single focus lens than is currently available. The single focus lens is for use in a compact, yet low-cost camera, particularly a digital camera.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 2A–2D show the spherical aberration, astigmatism, distortion and lateral color, respectively, of the single focus lens according to a first embodiment of the invention; and FIGS. 3A–3D show the spherical aberration, astigmatism, distortion and lateral color, respectively, of the single focus lens according to a second embodiment of the invention.

DETAILED DESCRIPTION

Figure 1:
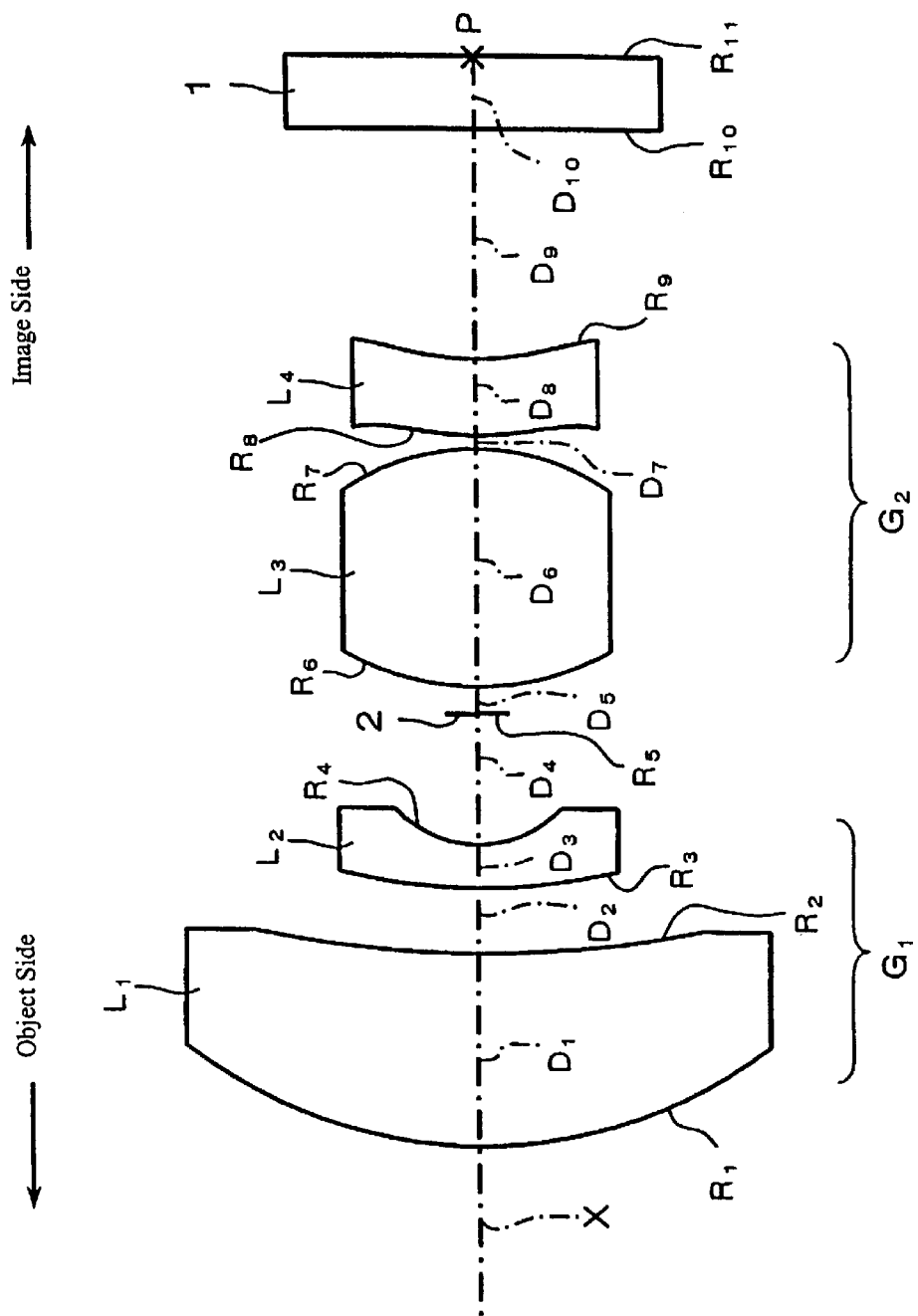
FIG. 1 shows the basic lens element configuration of the present invention.

The present invention relates to a low-cost, single focus lens that is formed of only four lens elements, and more particularly relates to a single focus lens suitable for use in a digital camera.

The low-cost, single focus lens of the present invention is formed of, in order from the object side, a front lens group having overall negative refractive power, a diaphragm, and a rear lens group having overall positive refractive power. The front lens group is formed of, in order form the object side, a first lens element of positive refractive power and a meniscus shape with its convex surface on the object side, and a second lens element of negative refractive power and a meniscus shape with its convex surface on the object side. The rear lens group is formed of, in order from the object side, a third lens element that is biconvex and a fourth lens element having relatively weak refractive power (as compared to the refractive power of each of the other lens elements) that is made of a plastic material with at least one surface being aspherical. In addition, preferably, the following Conditions (1)–(3) are satisfied:

| | |
|---|---|
| $v_{d3} > 50$ | Condition (1) |
| $v_{dA} < 65$ | Condition (2) |
| $f/f_{G1} > -2.5$ | Condition (3) | where $v_{d3}$ is the Abbe number of the third lens element, in order from the object side, as measured relative to the d-line, $v_{dA}$ is the Abbe number of each of the first through third lens elements, in order from the object side, as measured relative to the d-line;

f is the focal length of the single focus lens, and $f_{G1}$ is the focal length of the front lens group.

The fourth lens element having a relatively weak refractive power functions as a so-called corrective lens. The term "relatively weak" refractive power, as used herein, refers to the corrective lens having a power that is less in absolute value than any of the other lens elements and less than 10% that of the low cost, single focus lens. At least one surface of the corrective lens is aspheric and has a shape defined by the following equation (A):

$$Z = CY^2/\{1+(1-KC^2Y^2)^{1/2}\} + A_4Y^4 + A_6Y^6 + A_8Y^8 + A_{10}Y^{10} \quad \text{(Equation A)}$$

where

Z is the length (in mm) of a line drawn from a point on the aspherical surface at a distance Y from the optical axis to the tangential plane of the aspherical surface vertex, C is the paraxial curvature (C=1/R), Y is the distance (in mm) from the optical axis, K is the eccentricity, and $A_4$, $A_6$, $A_8$, and $A_{10}$ are the 4th, 6th, 8th, and 10th aspherical coefficients.

The lens element configuration of the two embodiments of the present invention will now be described with reference to the drawings.

Embodiment 1

FIG. 1 shows the single focus lens according to a first embodiment of the invention, which is formed of, in order from the object side, a front lens group $G_1$ having overall negative refractive power, a diaphragm 2, and a rear lens group $G_2$ having overall positive refractive power. Light rays that are incident along an optical axis X are efficiently condensed to an image position P on a cover glass 1 of an imaging element.

The front lens group $G_1$ is formed of, in order from the object side, a first lens element $L_1$ of positive refractive power and a meniscus shape with its convex surface on the object side, and a second lens element $L_2$ of negative refractive power and a meniscus shape with its convex surface on the object side. The rear lens group $G_2$ is formed of, in order from the object side, a third lens element $L_3$ that is biconvex, and a fourth lens element $L_4$ that is made of a plastic material and has relatively weak refractive power, with both surfaces thereof being aspherical and having a shape which is defined by the above Equation (A).

In this way, in the single focus lens according to this configuration of the embodiment, by using a plastic material to form the fourth lens element $L_4$ and using a glass material in the first lens element $L_1$, the second lens element $L_2$ and the third lens element $L_3$, it is possible to reduce the manufacturing cost. In addition, because the fourth lens element $L_4$ has relatively weak refractive power and serves primarily as a corrective lens, substantially no aberrations occur and the various aberrations that occur in the first lens element $L_1$ through the third lens element $L_3$ can be favorably corrected. Furthermore, because the fourth lens element $L_4$ has relatively weak refractive power, the design of the aspherical surface can be made easy.

The fourth lens element $L_4$ has been considered to be aspherical on both surfaces, but it is possible to accomplish good aberration correction if an aspherical surface is provided on at least one of the surfaces of the fourth lens element $L_4$.

Furthermore, the single focus lens according to this embodiment satisfies the above Conditions (1)–(3). Condition (1) limits the Abbe number of the third lens element $L_3$ and, if Condition (1) is not satisfied, correction of chromatic aberrations becomes difficult. In addition, Condition (2) limits the Abbe number of the first lens element $L_1$ through the third lens element $L_3$, which are made of glass and, when the Abbe number of any of these lens elements exceeds does not satisfy the condition, the cost of the glass material rises, and the level of difficulty in manufacturing increases so as to increase production costs. In addition, Condition (3) stipulates the ratio of the refractive power of the lens system as a whole to that of the front lens group $G_1$. When Condition (3) is not satisfied, it becomes difficult to make the single focus lens compact, and the sensitivity to imperfect alignment of the front group $G_1$ and the rear group $G_2$ (between which the diaphragm 2 is positioned) increases, thereby increasing assembly costs.

Table 1 below lists the surface number #, in order from the object side, the radius of curvature R (in mm) of each surface, the on-axis spacing between surfaces, as well as the index of refraction $N_d$ and the Abbe number $v_d$ (for the d-line) of each lens element of the low-cost, single focus lens according to Embodiment 1 of the present invention. Those surfaces marked with an asterisk on the right side of the surface number are aspheric surfaces, as described above. In the lower portion of the table are listed the values corresponding to the focal length f of the single focus lens, the F-number $F_{NO}$, the image angle $2\omega$, and the values that correspond Conditions (1)–(3) for this embodiment.

TABLE 1

| # | R | D | $N_d$ | $v_d$ |
|---|---|---|---|---|
| 1 | 8.3461 | 3.50 | 1.78472 | 25.7 |
| 2 | 19.0636 | 1.18 | | |
| 3 | 10.3692 | 0.79 | 1.68893 | 31.2 |
| 4 | 2.0490 | 2.36 | | |
| 5 | ∞ | 0.50 | | |
| 6 | 4.8468 | 4.30 | 1.58913 | 61.2 |
| 7 | −4.1660 | 0.24 | | |
| 8* | 5.9820 | 1.40 | 1.50848 | 56.4 |
| 9* | 5.0184 | 4.15 | | |
| 10 | ∞ | 1.30 | 1.51680 | 64.2 |
| 11 | ∞ | | | | f = 6.41 mm   $F_{NO}$ = 5.6   $2\omega$ = 54.8°
$v_{d3}$ = 61.2   $v_{dA}$: $v_{d1}$ = 25.7; $v_{d2}$ = 31.2; $v_{d3}$ = 61.2
$f/f_{G1}$ = −0.79

As is apparent from comparing the values shown in the last two lines of Table 1 with Conditions (1)–(3), Embodiment 1 satisfies each of Conditions (1)–(3).

Table 2 below lists the values of the constant K and the aspheric coefficients $A_4$, $A_6$, $A_8$ and $A_{10}$ for Equation (A) above for each of the aspheric surfaces (#8 and #9) of Embodiment 1. An "E" in the data below indicates that the number following is the exponent to the base 10. For example, "1.0E-02" represents $1.0 \times 10^{-2}$.

TABLE 2

| # | K | $A_4$ | $A_6$ | $A_8$ | $A_{10}$ |
|---|---|---|---|---|---|
| 8 | −6.7682 | −1.8077E−3 | −1.5109E−3 | 0 | 0 |
| 9 | −4.5566 | 3.7295E−3 | −1.8012E−3 | 9.7572E−5 | 2.2157E−6 |

FIGS. 2A–2D show the spherical aberration, astigmatism, distortion and lateral color, respectively of the single focus lens of Embodiment 1. The spherical aberration is shown for the C-line, g-line and the d-line. The astigmatism is shown with respect to the sagittal S image surface and the tangential T image surface, and the lateral color is shown for the C-line and the g-line. The distortion is shown for the d-line. In FIGS. 2B–2D, ω is the half-image angle. As is clear from these figures, the single focus lens of this embodiment has its aberrations favorably corrected.

Embodiment 2

The single focus lens according to Embodiment 2 has the same basic lens element configuration as that of Embodiment 1, however, the specific construction values differ in some respects.

Table 3 below lists the surface number #, in order from the object side, the radius of curvature R (in mm) of each surface, the on-axis spacing between surfaces, as well as the index of refraction $N_d$ and the Abbe number $v_d$ (for the d-line) of each lens element of the low-cost, single focus lens according to Embodiment 2 of the present invention. Those surfaces marked with an asterisk on the right side of the surface number are aspheric surfaces, as described above. In the lower portion of the table are listed the values corresponding to the focal length f of the single focus lens, the F-number $F_{NO}$, the image angle $2\omega$, and the values that correspond to the values listed in Conditions (1)–(3) for this embodiment.

TABLE 3

| # | R | D | $N_d$ | $v_d$ |
|---|---|---|---|---|
| 1 | 7.5355 | 2.80 | 1.80518 | 25.5 |
| 2 | 18.6530 | 1.18 | | |
| 3 | 9.4426 | 0.79 | 1.71736 | 29.5 |
| 4 | 1.9538 | 2.36 | | |
| 5 | ∞ | 0.50 | | |
| 6 | 4.4042 | 4.30 | 1.58913 | 61.2 |
| 7 | −4.1660 | 0.24 | | |
| 8* | 9.2120 | 1.40 | 1.50848 | 56.4 |
| 9* | 7.1098 | 4.13 | | |
| 10 | ∞ | 1.30 | 1.51680 | 64.2 |
| 11 | ∞ | | | | f = 6.40 mm   $F_{NO}$ = 5.6   $2\omega$ = 54.8°
$v_{d3}$ = 61.2   $v_{dA}$: $v_{d1}$ = 25.5; $v_{d2}$ = 29.5; $v_{d3}$ = 61.2
$f/f_{G1}$ = −0.81

As is apparent from comparing the values shown in the last two lines of Table 3 with Conditions (1)–(3), Embodiment 2 satisfies each of Conditions (1)–(3).

Table 4 below lists the values of the constant K and the aspheric coefficients $A_4$, $A_6$, $A_8$ and $A_{10}$ for Equation (A) above for each of the aspheric surfaces (#8 and #9) of Embodiment 2. An "E" in the data below indicates that the number following is the exponent to the base 10. For example, "1.0E-02" represents $1.0 \times 10^{-2}$.

TABLE 4

| # | K | $A_4$ | $A_6$ | $A_8$ | $A_{10}$ |
|---|---|---|---|---|---|
| 8 | −6.8158 | −6.5629E−3 | −1.8521E−3 | 0 | 0 |
| 9 | −4.8074 | −8.6045E−4 | −1.8578E−3 | 1.6695E−4 | −3.0849E−6 |

FIGS. 3A–3D show the spherical aberration, astigmatism, distortion and lateral color, respectively of the single focus lens of Embodiment 2. The spherical aberration is shown for the C-line, g-line and the d-line. The astigmatism is shown with respect to the sagittal S image surface and the tangential T image surface, and the lateral color is shown for the C-line and the g-line. The distortion is shown for the d-line. In FIGS. 3B–3D, ω is the half-image angle. As is clear from these figures, the single focus lens of this embodiment has its aberrations favorably corrected.

As the single focus lens of the present invention, the above-described embodiments are intended to be illustrative and not limiting, for it is possible to comprise the lens by appropriately selecting the shape of the various lenses and the shape of the aspherical surfaces.

As explained in detail above, the single focus lens of the present invention has a four lens element composition in which the third lens element has a positive refractive power and is made from a low-dispersion glass material having an Abbe number greater than 50, and the fourth lens element is made from a plastic material which has a meniscus shape with an aspheric surface and has relatively weak refractive power. Consequently, it is possible to make the lens system compact and inexpensive, and despite the low cost, single focus lens having only four lens elements, it provides good optical performance.

The invention being thus described, it will be obvious that the same may be varied in many ways. For example, the single focus lens of the invention is not limited to the specific embodiments given, as the construction parameters such as the choice of optical materials, the shape of the various lens elements and the shape of the aspherical surface can be varied. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A low-cost, single focus lens formed of only four lens elements, as follows, in order from the object side:

a front lens group having an overall negative refractive power and formed of a first lens element of positive refractive power having a meniscus shape with its convex surface on the object side, and a second lens element of negative refractive power having a meniscus shape with its convex surface on the object side;

a diaphragm; and a rear lens group having an overall positive refractive power and formed of a third lens element that is biconvex and a fourth element that is made of plastic, said fourth optical element being weaker in refractive power than each of the first through third lens elements and having at least one surface thereof that is aspheric.

2. The low-cost, single focus lens of claim 1, wherein the following Conditions (1)–(3) are satisfied:

| $\nu_{d3} > 50$ | Condition (1) |
|---|---|
| $\nu_{dA} < 65$ | Condition (2) |
| $f/f_{G1} > -2.5$ | Condition (3) | where $\nu_{d3}$ is the Abbe number of the third lens element, in order from the object side, as measured relative to the d-line, $\nu_{dA}$ is the Abbe number of each of the first through third lens elements, in order from the object side, as measured relative to the d-line, f is the focal length of the single focus lens, and $f_{G1}$ is the focal length of the front lens group.

3. The low-cost, single focus lens of claim 1, wherein the fourth lens element has a refractive power that is less in absolute value than any of the other lens elements and less than 10% the refractive power of the low-cost, single focus lens.

4. The low-cost, single focus lens of claim 2, wherein the fourth lens element has a refractive power that is less in absolute value than any of the other lens elements and less than 10% the refractive power of the low-cost, single focus lens.

* * * * *

UNITED STATES PATENT AND TRADEMARK OFFICE
CERTIFICATE OF CORRECTION

PATENT NO. : 6,717,748 B2
DATED : April 6, 2004
INVENTOR(S) : Sato

It is certified that error appears in the above-identified patent and that said Letters Patent is hereby corrected as shown below:

Column 1,
Line 31, change "favorable" to -- favorably --;
Line 63, change "in order from" to -- in order from --;

Column 2,
Line 20, change "to the d-line;" to -- to the d-line, --;

Column 3,
Line 25, delete "exceeds";
Line 47, change "correspond" to -- correspond to --;

Column 6,
Line 14, change "a fourth element" to -- a fourth lens element --; and
Line 15, change "said fourth optical element" to -- said fourth lens element --.

Signed and Sealed this

Twelfth Day of October, 2004

JON W. DUDAS
*Director of the United States Patent and Trademark Office*